(No Model.)

J. J. EBERHARD.
KNIFE.

No. 485,264. Patented Nov. 1, 1892.

Witnesses.
E. Byron Gilchrist.

Inventor.
John J. Eberhard

UNITED STATES PATENT OFFICE.

JOHN J. EBERHARD, OF FREMONT, OHIO, ASSIGNOR TO THE CLAUSS SHEAR COMPANY, OF SAME PLACE.

KNIFE.

SPECIFICATION forming part of Letters Patent No. 485,264, dated November 1, 1892.

Application filed November 4, 1891. Serial No. 410,863. (No model.)

*To all whom it may concern:*

Be it known that I, JOHN J. EBERHARD, of Fremont, in the county of Sandusky and State of Ohio, have invented certain new and useful Improvements in Knife-Handles; and I do hereby declare the following to be a full, clear, and exact description of the invention, such as will enable others skilled in the art to which it pertains to make and use the same.

My invention relates to improvements in handles more especially adapted for bread-knives, the object being to provide a light, simple, convenient, efficient, and comparatively-inexpensive handle.

With this object in view my invention consists in certain features of construction and in combination of parts, hereinafter described, and pointed out in the claim.

Figure 1:
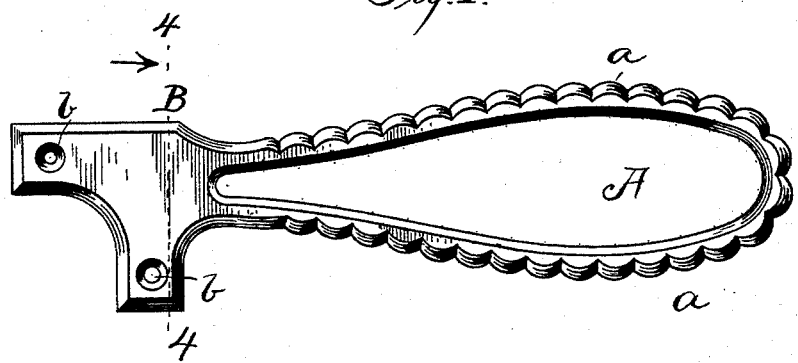
Figure 2:
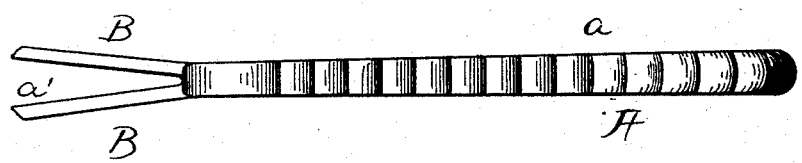
Figure 3:
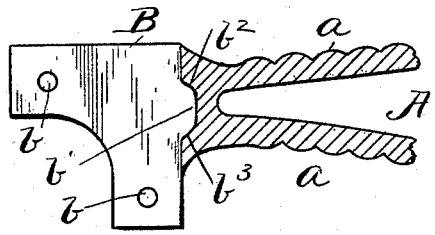
Figure 4:
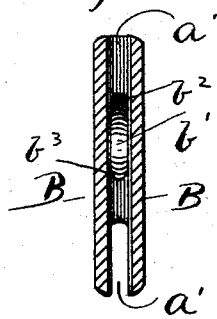

In the accompanying drawings, Figure 1 is a side elevation of my improved handle. Fig. 2 is a plan view of the same. Fig. 3 is a side elevation, partly in section. Fig. 4 is a transverse vertical section on line 4 4, Fig. 1, looking in the direction of the arrow.

My improved handle is preferably made of malleable iron and comprises, preferably, a loop-shaped grip A, that is provided with ridges or alternating depressions and elevations on its outer surface, as at $a$, thus rendering impossible the slipping of the handle when in the hand.

At the forward end the handle is divided longitudinally, as at $a'$, forming members B B, that constitute a clip adapted to receive the shank of the knife. (Not shown.) Members B B are perforated, as at $b$, for the reception of rivets or pins for securing the knife to the handle. By means of the peculiar construction of clip just described members B B of the clip will be sufficiently yielding that when riveted to the knife they can be made to so closely embrace the shank of the knife as to securely hold the latter in place within the clip; but to still more positively hold the knife-blade to the handle the clip internally at the rear thereof is chambered or recessed, as at $b'$, said chamber or recess being adapted to receive a corresponding projecting member of the shank of the knife. It will be observed that recess or chamber $b'$ affords additional bearing-surface for the knife—viz., top and bottom, as at $b^2\ b^3$—and, together with the riveting and peculiar construction of clip aforesaid, constitutes a very effectual and substantial means of fastening the handle to the knife and preventing the latter from becoming loose and displaced.

The entire handle is preferably made of a single piece of material, and when thus made of malleable iron constitutes not only an exceedingly cheap and substantial handle, but one that is light and susceptible of receiving almost any finish desired.

What I claim is—

As an article of manufacture, a knife-handle terminating at its forward end in a clip comprising a pair of jaws formed by splitting the end of the handle, the crotch of the split end having a recess $b'$ formed therein and shoulders $b^2$ adjacent to the ends of the recess, the members of the clip terminating in two projections extending substantially at right angles to each other and triangularly arranged relative to the recess, said projections having holes formed therein adapted to receive screws, nails, or rivets for securing the clip to the blade held by them, substantially as set forth.

In testimony whereof I sign this specification, in the presence of two witnesses, this 23d day of October, 1891.

JOHN J. EBERHARD.

Witnesses:
LESTER WILSON,
W. W. ESCH.